UNITED STATES PATENT OFFICE.

ISAAC ATKINSON, OF HAMILTON, CANADA.

IMPROVEMENT IN CURING AND PACKING MEATS.

Specification forming part of Letters Patent No. 134,965, dated January 21, 1873.

*To all whom it may concern:*

Be it known that I, ISAAC ATKINSON, of the city of Hamilton, in the county of Wentworth, in the Province of Ontario, Canada, have invented certain new and useful Improvements in the Art or Process of Curing and Packing Shoulders, Hams, and Bacon for Shipment; and I do hereby declare the following to be a full, clear, and exact description of the operation of the same.

Hogs after killing and dressing are hung in a cooling-room with temperature at forty (40°) degrees, where they are allowed to remain for thirty-six hours. The shoulders, hams, and bacon are then laid singly on the floor of a large tank or vat (from which water can drain) and covered with small broken ice and salt mixed. This is again covered with a layer of meat, and this in its turn with broken ice and salt; and so on, alternate layers of meat and broken ice mixed with salt, until the tank is full. The shoulders, hams, and bacon are allowed to remain in this state for twenty-four hours, at the expiration of which time they are moved and placed in another tank and filled up with pickle of full strength, where they are allowed to remain for twenty-four hours. They are then drawn out and laid in rows on the floor of a cellar with a temperature of forty (40°) degrees, having been sprinkled lightly with saltpeter and well covered with coarse salt. After lying in this position for seven days they are removed, freshly covered with salt, and allowed to lie in a similar position for seven days longer, when they are again removed, resalted, laid down, and left for sixteen days more, at the expiration of which time (thirty days from the period of first going into salt) the shoulders, hams, and bacon may be considered fully cured.

To prepare the meat for packing it is well brushed in clean cold water and allowed to drain for twenty-four hours, then weighed, and all moisture carefully wiped off with a dry cloth, after which it is sprinkled well over with fine-ground alum or rubbed over with it.

The shoulders, hams, and bacon, after being well rubbed in alum, are then put into paper bags saturated with a strong solution of alum, or rolled in straw-boards moistened with alum-water until they are quite flexible; the straw-boards thus adapt themselves to the form of the hams and shoulders, and when dry thoroughly exclude all air and render the meat impervious to moisture. The bacon is treated similarly, well rubbed in fine alum and a straw-board between each side. The shoulders, hams, or bacon are then put into boxes, well pressed down, containing about five hundred pounds.

It will be observed that I do not pile the shoulders, hams, or bacon when being salted, but place them separately upon shelves, so that the salt thoroughly permeates them, and the meat is not pressed out of its natural shape, thus preventing the generation of heat or tendency to taint from the sides being piled on each other before all animal heat has passed off. They are thus cured in less time through the free action of the air on the salt.

The advantages of this improved art or process of curing and packing shoulders, hams, and bacon for shipment are: The meat packed in Canada or United States by this process arrives in England and other countries, when shipped in a dry, well-cured, and mellow state, fit for use without being oversalted.

I do not claim the first part of the process of curing hams and bacon—viz., the employment of ice, salt, &c., as described—as new; but

What I claim as new, and desire to secure by Letters Patent, consists in—

Rolling meats in fine-ground alum after being fully salted and washed, and packing with an ordinary sheet of paper between each piece of meat to prevent injurious contact, as and for the purpose specified.

Dated at Hamilton, Canada, this 17th day of September, 1872.

ISAAC ATKINSON.

Signed in the presence of—
 WM. BRUCE,
 P. L. SCRIVEN.